United States Patent [19]

Maurer

[11] Patent Number: 5,710,926
[45] Date of Patent: Jan. 20, 1998

[54] DEVELOPERS TOOL FOR OBJECT-ORIENTED PROGRAMMING

[76] Inventor: Joseph Clark Maurer, 3120 Poplarwood Ct., Ste. 3100, Raleigh, N.C. 27604

[21] Appl. No.: 116,725

[22] Filed: Sep. 3, 1993

[51] Int. Cl.⁶ .................. G06F 9/00; G06F 9/44
[52] U.S. Cl. ........................... 395/701; 395/326
[58] Field of Search ..................... 395/700, 155, 395/701, 702, 703, 704, 710, 326, 333, 334, 335, 339, 340, 347, 352, 353, 354, 973, 974, 975

[56] References Cited

U.S. PATENT DOCUMENTS

| | | | |
|---|---|---|---|
| 5,075,847 | 12/1991 | Fromme | 395/700 |
| 5,133,070 | 7/1992 | Barker et al. | 395/650 |
| 5,327,529 | 7/1994 | Fults et al. | 395/155 |
| 5,335,320 | 8/1994 | Iwata et al. | 395/155 |
| 5,339,433 | 8/1994 | Frid-Nielsen | 395/700 |
| 5,361,350 | 11/1994 | Conner et al. | 395/600 |
| 5,515,536 | 5/1996 | Corbett et al. | 395/700 |

OTHER PUBLICATIONS

"Turbo Vision Programming Guide", Borland International Inc., 1992, pp. 1–4, 33–43 and 204–209.

Borland, "Borland C++ Version 3.0 User's Guide", 1992, pp. 33–36.

Stevens, Al, "Software Development '92 and D–Flat dialog boxes", Dr. Dobb's Journal, v17 n6, Jun. 1992, pp. 123–130.

Stevens, Al, "of Jazz, C++, and D–flat controls", Dr. Dobb's Journal, v17 n7, Jul. 1992, pp. 119–127.

Journal:DBMS vol.:V6 Issue:n8 Pagination: p.24(2)Publication Date: Jul., 1993 Title: ObjectView version 2.0.

*Primary Examiner*—Dennis M. Butler
*Attorney, Agent, or Firm*—Rhodes Coats & Bennett, L.L.P.

[57] ABSTRACT

A software developer's tool to help write application programs for an object-oriented operating system includes a storage device holding code. The code includes a clipboard copying utility and a first code section permitting the identification of dialog boxes and event tables associated with dialog boxes, the event tables signifying events capable of taking place during running of the application program to be written. A second code section permits the copying of dialog boxes and their associated event tables by actuation of the clipboard copying utility, and creates a new object identical to the parent object, providing a unique object name for the new object, and generating an event table name for the event table associated with the new object derived from the name of the parent object such that the event table includes controls having names derived from the name of the event table. A third code section permits editing of the child event table without altering the parent event table. Sequential use of the first, second and third code sections creates a parent object and a child object having associated parent and child event tables, the child object having an event table derived from the parent event table and having the capability of running independently of the parent object.

15 Claims, 7 Drawing Sheets

DEVELOPERS TOOL FOR OBJECT-ORIENTED PROGRAMMING

BACKGROUND OF THE INVENTION

The present invention relates to methods and apparatus adjunct to a text editor for use by applications programmers working in object oriented operating systems such as Microsoft Windows, Macintosh and OS/2. Applications for object oriented systems have their source code written in modules associated with "objects". The objects refer to other objects in a hierarchical relationship, resulting in a tree structure of object relationships.

The operating system has a "focus" which can be directed by a user or the program down one or more of the chains of linked objects in the hierarchy structure. In a graphical user interface type of operating system such as Windows or Macintosh, the various icons appearing on a screen are associated with objects. Thus, when that icon is selected, that object and the code to carry out the object and, indeed, to display the icon is selected. Nested within the object may be other objects. A particular type of an object is a dialog box, which can also have hierarchically below it other objects such as controls, event tables, and commands. When an object is selected or activated, its associated code runs, producing the desired result.

A common element to virtually all of object-oriented operating systems is a utility called a clipboard. A clipboard is a temporary storage area in which data from one application can be stored in order to be transferred to another application. To date, clipboards have been limited to data transfers. That is, programmers could not use the clipboard copying utility to copy dialog boxes or other objects in a form so that code necessary for implementation of functions associated with the object is also copied in a manner allowing independent or dependent code modification.

SUMMARY OF THE INVENTION

The present invention fulfills this need in the art by providing a software developer's tool to help write application programs for an object-oriented operating system including a storage device holding code. The code includes a copying utility and a first code section permitting the identification of objects and event tables associated with objects in which the event tables signify events capable of taking place during running of the application program to be written. A second code section permits the copying of objects and their associated event tables by actuation of the copying utility. The sequential use of the first and second code sections creates a parent object and a child object having associated parent and child event tables, the child object having an event table derived from the parent event table and having the capability of running independently of the parent object.

Preferably, the copying utility is a clipboard copying utility.

Preferably, the code includes a section permitting editing of the child event table without altering the parent event table. Typically, the editing of the child object may include creating a new control on the child object with a name different than any other controls on the child object. The new control will have its own event table.

The parent and child objects may be dialog boxes.

Preferably, the repeated use of the second code section results in a chain of parent and child objects. In a preferred embodiment, the repeated running of the second section of code forms a linked list of event tables. If so, in the running of the application program, the running of the code for an object includes looking in an index for the linked list to find event handlers for the object being run and executing the event handler.

If the code is in C++ language, the event table may be a C++ class and events within the event table may be C++ methods.

Desirably, actuation of the second code section creates a new object identical to the parent object, generates a unique object name for the child object which is different from but derived from the parent object, and generates a unique event table name for the event table associated with the child object derived from the name of the parent object. The child object may include event tables having names derived from the names of the controls. Typically, each of the controls and event tables are objects.

Running the code writes source code of the application program such that the source code for the child object includes pointers to the source code for the parent object to run the parent object's source code when running the child object's code. Running the code also permits editing of the event table associated with the child object to cause the running of the child object's code to be different from the running of the parent object's code, without modifying the parent object's code.

In one embodiment, running the code may write source code of the application program such that upon compiling the application program source code to object code, the object code for the child object includes pointers to the object code for the parent object to run the parent object's code when running the child object's code.

In another embodiment, during the compilation of the application program, the object code for a child object includes object code copied from the parent object.

Preferably, running the code permits editing of the event table associated with the child object to cause the running of the child object's code to be different from the running of the parent object's code, without modifying the parent object's code.

The invention also provides a software application program for an object-oriented operating system including a storage device holding object code, the object code including directions for displaying a first dialog box and an event table associated with the first dialog box, the event table including event handlers responsive to events capable of taking place during running of the code for the first dialog box, and directions for displaying a second dialog box and a second event table associated with the second dialog box, the second event table including a pointer to the first dialog box event table to actuate certain event handlers in the first dialog box. Upon running the object code the first dialog box may from time to time be actuated and the second dialog box may from time to time be actuated and the actuation of the second dialog box may include running code of the first event table by virtue of the actuation of the pointer in the second event table.

The invention also provides a method of writing software application programs for an object-oriented operating system including writing a first code section which includes the identification of a parent object and a parent event table associated with the parent object, the event table including event handlers responsive to events capable of taking place during running of the code identifying the first object. The method further includes copying the parent object and parent event table by actuation of a copying utility to create a related child object having an associated child event table derived from the parent event table and having the capability of running independently of the parent object.

Preferably, the copying step includes establishing a pointer in the child event table to the parent event table.

The invention also includes a method of running a software application program in an object-oriented operating system including displaying a first dialog box and actuating an event table associated with the first dialog box, the event table including event handlers responsive to events capable of taking place during display of the first dialog box, and displaying a second dialog box and actuating a second event table associated with the second dialog box, the second event table including event handlers responsive to events capable of taking place during display of the second dialog box and a pointer to the first dialog box. Upon the occurrence of an event in the second event table, the method includes actuating an event handler in the first event table pointed to by the pointer in the second event table.

BRIEF DESCRIPTION OF THE DRAWINGS

The invention will be better understood by the reading of the detailed description of the preferred embodiment, along with a review of the drawings in which.

DETAILED DESCRIPTION OF THE PREFERRED EMBODIMENT

The present invention enhances the ability of a clipboard to transfer more than just data—it can transfer objects, including pointers to the associated code. The transfer can be to another application or to another object within the same application. The object to be "copied" can be circled in graphical form on the screen using a mouse and then transferred to the clipboard, carrying with it not just data, but also the pointers to the object code which makes the object run. From the clipboard it can then be transferred to any destination clipboards are usually used for. The transferee "file" can include the lines of code designated from the parent code by way of its pointers, but can be edited and augmented. That is, the destination file can ignore certain lines of code in the parent file, and additional lines can be added. These changes do not change the parent file, but only the implementation of the inherited code by the daughter file.

These "copies" can then be made from the daughter file on and on for as many generations as desired. This is a very useful tool for writing applications programs where similar functions or objects are going to be desired repeatedly, so that the programmer need not rewrite tedious lines of code. The invention is very useful for assisting programmers in creating dialog boxes, which include user interface elements.

One of the important and original elements in implementing this concept is the use of an event table which groups functions into a table. Important components of the event table are the pointers to the code used by the object, so that copying the event table copies the code pointers. The invention also uses a dialog editor that has the capability of recognizing the need to implement a conventional inheritance capability by detecting differences in names on event tables and their associated objects or controls. That is, using a naming convention in which the event table names are derived from their objects, differences in the names indicate the need to invoke inheritance, and the dialog editor is selected to take advantage of the convention to invoke inheritance when names are different.

The invention provides a software methodology which provides a way for a user to copy all or part of an object tree visible on screen and maintain the code pointers of the original objects in the new object tree. The new object tree inherits the code of the original object tree. In addition, new code may be added to the new object tree without affecting the code for the original object tree.

The invention may be used for object trees which are not visible on screen, but for ease of understanding the invention will be described with reference to dialog boxes, which are visible on the screen. The invention uses an event table. For more well-known object oriented languages such as C++, a class would be used to group the code instead of an event table, and each event would represent a method in the class.

As used in this specification the following terms have the associated definitions:

| | |
|---|---|
| command | An operation a software program carries out. |
| object | A group of one or more data items. |
| dialog box | A visible window on screen. A specific type of object. Dialog boxes usually contain smaller objects called controls. The children of a dialog box are the controls. The user can give a program information via a dialog box with child controls for use by a command. |
| control | An object which is a child of a dialog box. The parent of a control may be a control. Traversing up a tree of controls leads to the dialog box or other object. |
| statement | A set of symbols valid for the syntax of a programming language. |
| function | A group of statements. |
| method | A function which can only be executed by certain types of objects. |
| event | A computer generated occurrence or user generated occurrence. For example, a key stroke, mouse movement, mouse button press, or a timer tick. |
| event handler | A function that is called as the result of an event. |
| event table | A group of event handlers for a specific object such as a control or dialog box. |
| property | A data item which is contained by an object. For example, a dialog box has a title, a window size (x,y,height,width), and window color. An input field control has a window size and text. The text property contains what the user has typed into the input field. |
| dialog editor | A program which is used to create or modify dialog boxes with controls and allows a programmer to modify the properties and event handlers. |
| pointer | A pointer in the C programming sense means a specific memory location which is the start of some data or code. In a more general sense, it is a mechanism that specifies a location which is the start of some data or code. For |

|                                                                                                                                                                                                                                                                                                                    |
| ------------------------------------------------------------------------------------------------------------------------------------------------------------------------------------------------------------------------------------------------------------------------------------------------------------------- |
| example, source code for a program is stored in several files (or maybe just one file); Each source file typically has more than one function. One method for keeping track of where a function is would be to store the source file name and the offset (line number) into the file where the function starts. |
| offset     Relative pointer. A pointer refers to the start of code or data. An offset specifies a number of bytes, lines, or some other measurement from the start of some code or data. For the example above, offset was a line number relative to the start of a source file.                  |
| class      A group of methods and properties for a specific object such as a control or dialog box.                                                                                                                                                                                          |

Important elements to my implementation are as follows:

1. When a user creates a new empty dialog box, make sure the name given to the dialog box is different from all existing dialog boxes the user has already created. Maintain an event table name with the dialog box which is based on the dialog box name. In my implementation I name the event table the same as the dialog box. An event table is used to group event handling code for an object, such as a dialog box.

2. When the user creates a new child control (object) on the dialog box, maintain a control name which is different from other controls on the dialog box. Also maintain an event table name with the control which is based on the control name and the dialog box name. For example, if the dialog box has the name "box1", possible event table names for two child control objects could be "box1.control1" and "box1.control2".

Figure 1:
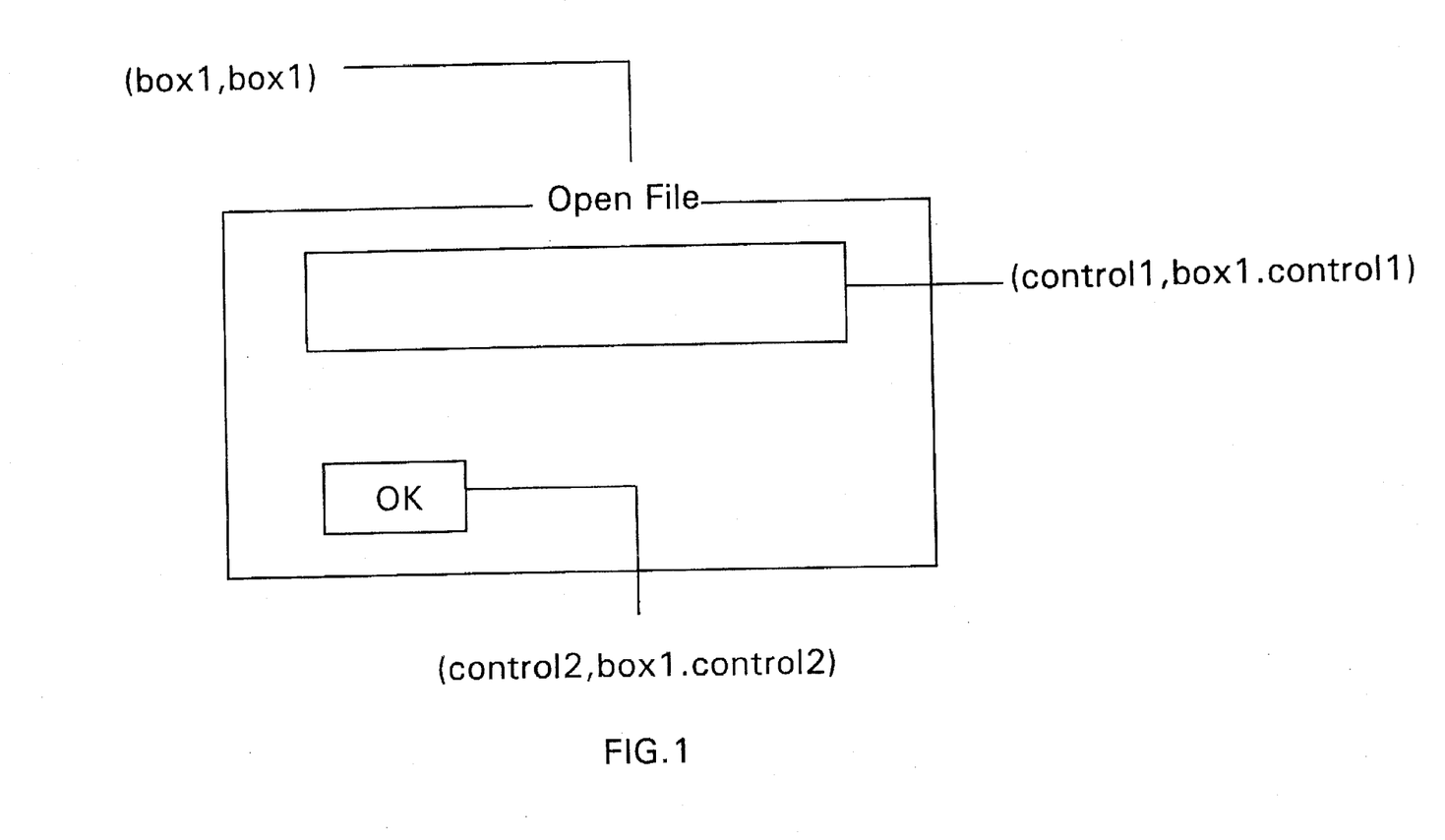
FIG. 1 is a schematic depiction of an original video display screen showing objects, with references to their associated names according to a first embodiment of the invention.
Figure 7:
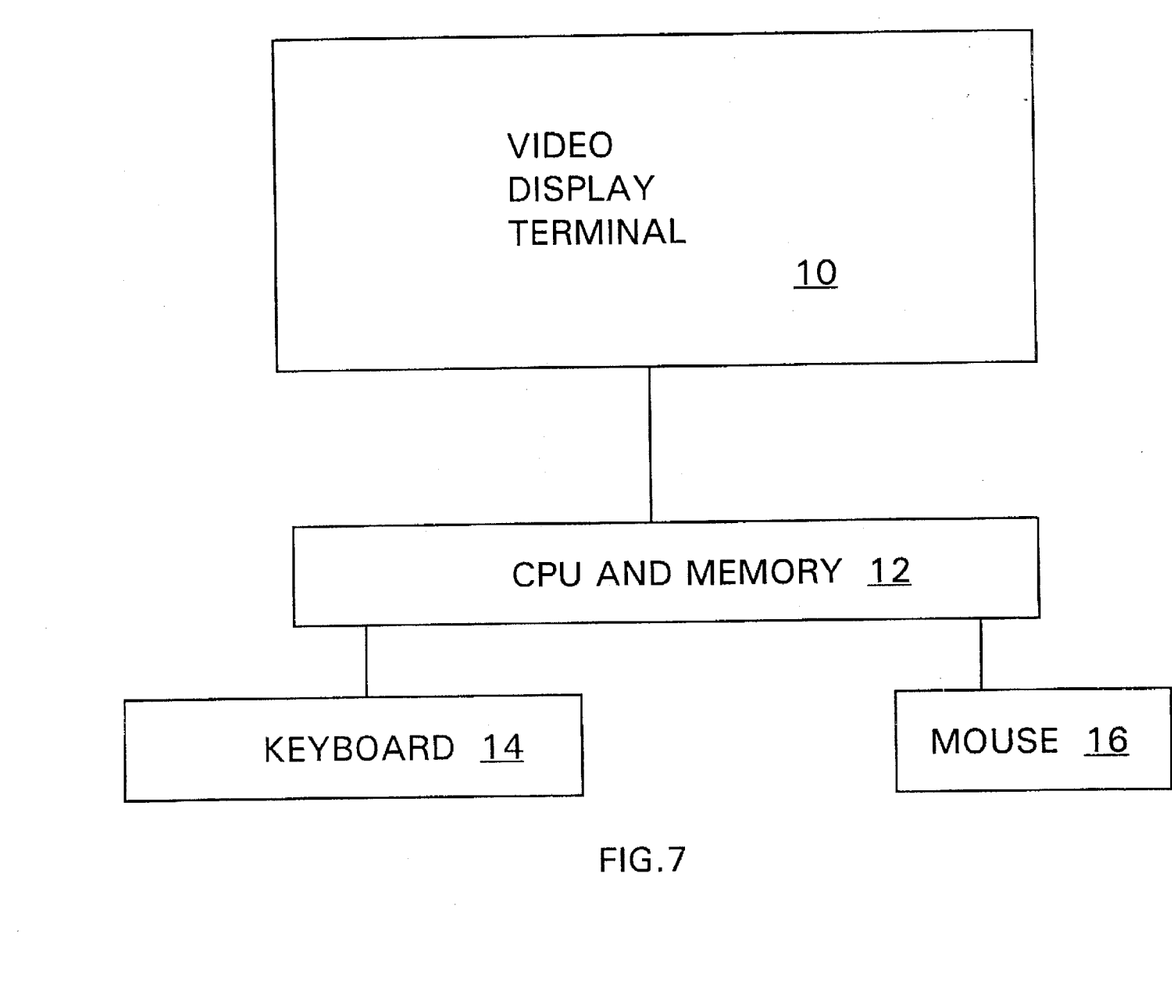
FIG. 7 is a schematic representation of a computer system in which the invention may be implemented.

Referring now to FIG. 1, there is depicted in schematic form a dialog box which may be displayed on a video display screen, such as the video display 10 under the control of CPU and memory 12 of FIG. 7. Also shown in FIG. 1 are the names of the various objects of the dialog box. The parenthesis pairs represent the name of the object to the left of the comma and its associated event table name on the right.

For example assume that "control1" represents an input field in which the user types, and "control2" represents a button (OK button) which is pushed when the user has finished typing into the input field. The pushing of the OK button is done by directing a pointer controlled by mouse 16 (seen in FIG. 7) to the portion of the screen associated with the "OK" legend and pressing a button on the mouse, in conventional fashion. The above dialog box might be used as a simple way for a user to enter a file name. Assume also that the programmer chooses not to allow percent ('%') or dollar sign ('$') characters to be typed into the input field. In Slick-C language in which the statement "defeventtab" means to define an event table, the code for processing the dialog box for box1 is as follows:

```
defeventtab box1.control1
control1.'%'( )    // Define an event handler for when the user types '%'
{
_beep( );          // Beep at the user to indicate an invalid character
}
control1.'$'( )    // Define an event handler for when the user types '$'
{
_beep( );          // Beep at the user to indicate an invalid character
}
defeventtab box1.control2
control2.lbutton_up( )  // Define event handler for pushing button with
                        // mouse
{
// Close the dialog box window and return the result
```

```
p_active_form._delete_window(control1.p_text)
}
```

(Note: Words to the right of the double slash "//" are not part of the computer commands but are descriptions helpful to programmers and those reading the programmers' code.)

Figure 2:
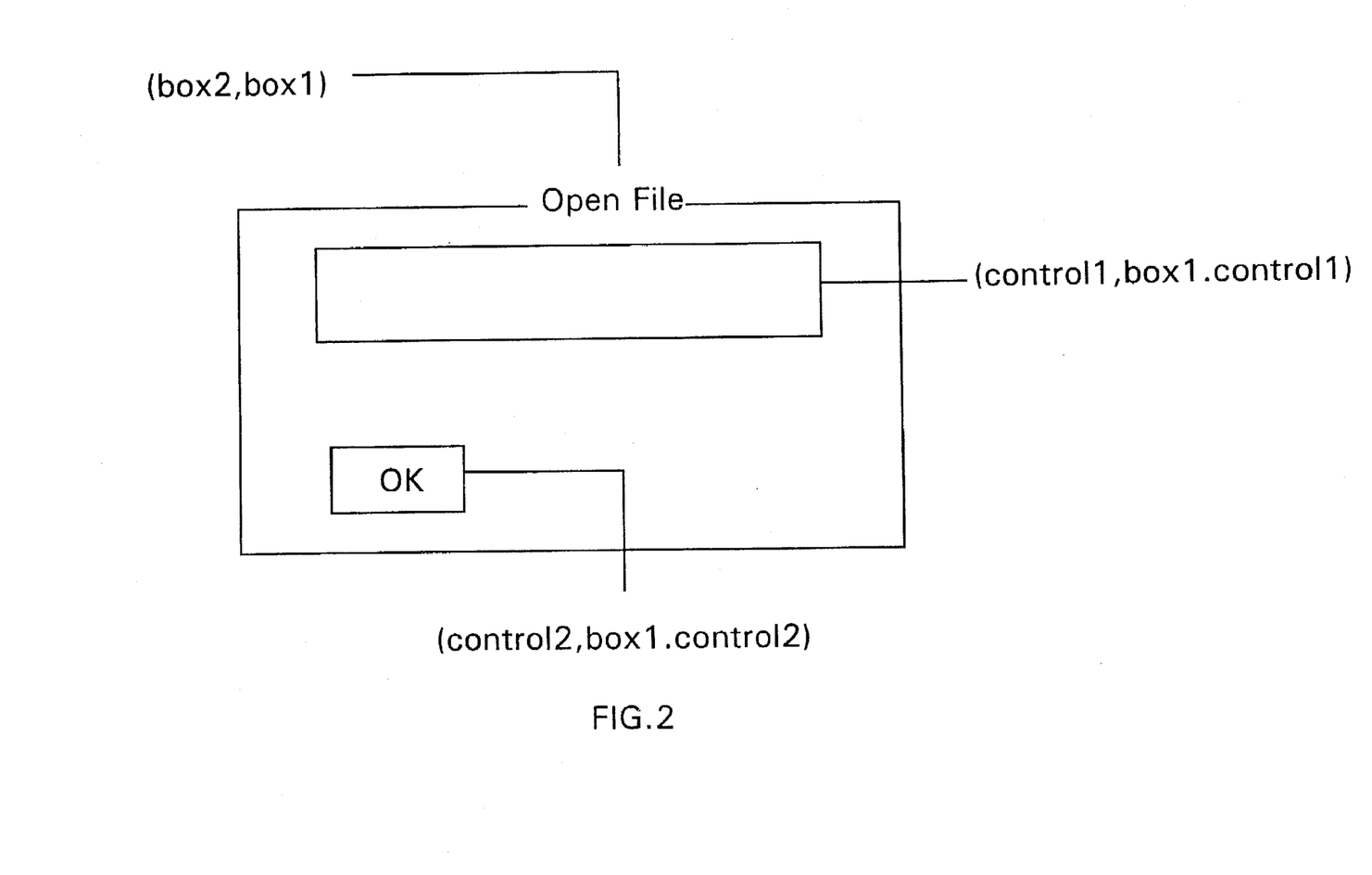
FIG. 2 is a schematic depiction of a video display screen showing copied objects, with references to their associated names according to the first embodiment.

The invention thus permits the copying of box1 while maintaining code pointers to the original code. In a graphical environment, this is typically done with the clipboard. However, copying a dialog box can also be done with a "duplicate" command or a "copy to new location" command. The programmer can visually select box1 on the screen by encircling it using the mouse and then invoke a command to copy/duplicate the object to a new location on the screen. To use the clipboard, the user copies the dialog box to the clipboard (a temporary storage location) and pastes the object at a new location on the screen. The new object appears as seen in FIG. 2.

The new dialog box must be given a name which is different than "box1". FIG. 2 illustrates that the new dialog box has been given the name "box2". All child controls for box2 keep the same name as before. All event table names for the dialog box "box2" remain the same. This allows the new dialog box to execute (inherit) the same code as the original dialog box.

Code may be added to the new dialog box without affecting the code for the original dialog box. Assume, for example that the reason for copying the "open file" dialog box is to create a similar dialog box which is used to find a string a user will specify in some file he or she is editing. In addition, for some reason the user does not want this input field to allow a percent ('%') or a dollar sign ('$') either. However, let's say that the programmer desires that when the user presses Ctrl-W in the input field, the word at the cursor in the file being edited is to be inserted into the input field to permit searching for other occurrences.

The programmer uses the dialog editor to change the caption of the dialog box "box2" from "Open File" to "Find". Then the programmer selects the input field control (control1) and uses the dialog editor to write an event handler for the selected object. This is done by double clicking the mouse 16 on control1. As is conventional with some dialog editors like VisualBasic, the code for the object will appear on the screen and can be edited from the keyboard 14. Select 'Ctrl-W' (i.e. a user's simultaneously pressing the "control" key and the 'W' Key of the keyboard) as the event you wish to modify. The dialog editor detects the need for inheritance by noticing that the existing event table attached to the input field control1 does not belong to this control because the name of the event table is "box1.control1". Notice that "box1", the name to the left of the '.' is not the name of the dialog box ("box2"). Therefore, the dialog editor inserts the following code into a new source file for dialog box "box2":

```
// box2 source
defeventtab box2.control1 _inherit box1.control1
control1.c_w( )
{
}
```

Now code and comments can be added to the event handler to achieve the following:

```
// box2 source
defeventtab box2.control1 _inherit box1.control1
control1.c_w( ) // Define event handler for user pressing Ctrl-W in input
{        //field
         keyin(get_cur_word( ))
}
```

The defeventtab statement above inherits the original event table. Alternatively, the defeventtab line may be typed in manually. This statement creates a linked list of event tables (inheritance chain) that can be scanned for event handlers for the control. If the user makes a copy of dialog box "box2" and adds another event handler to the input field control, the dialog editor links an event table called "box3.control1" to "box2.control1". Once an event handler is found, the event handler is executed and, in a preferred embodiment this halts the searching for the event handlers that follow.

Figure 3:
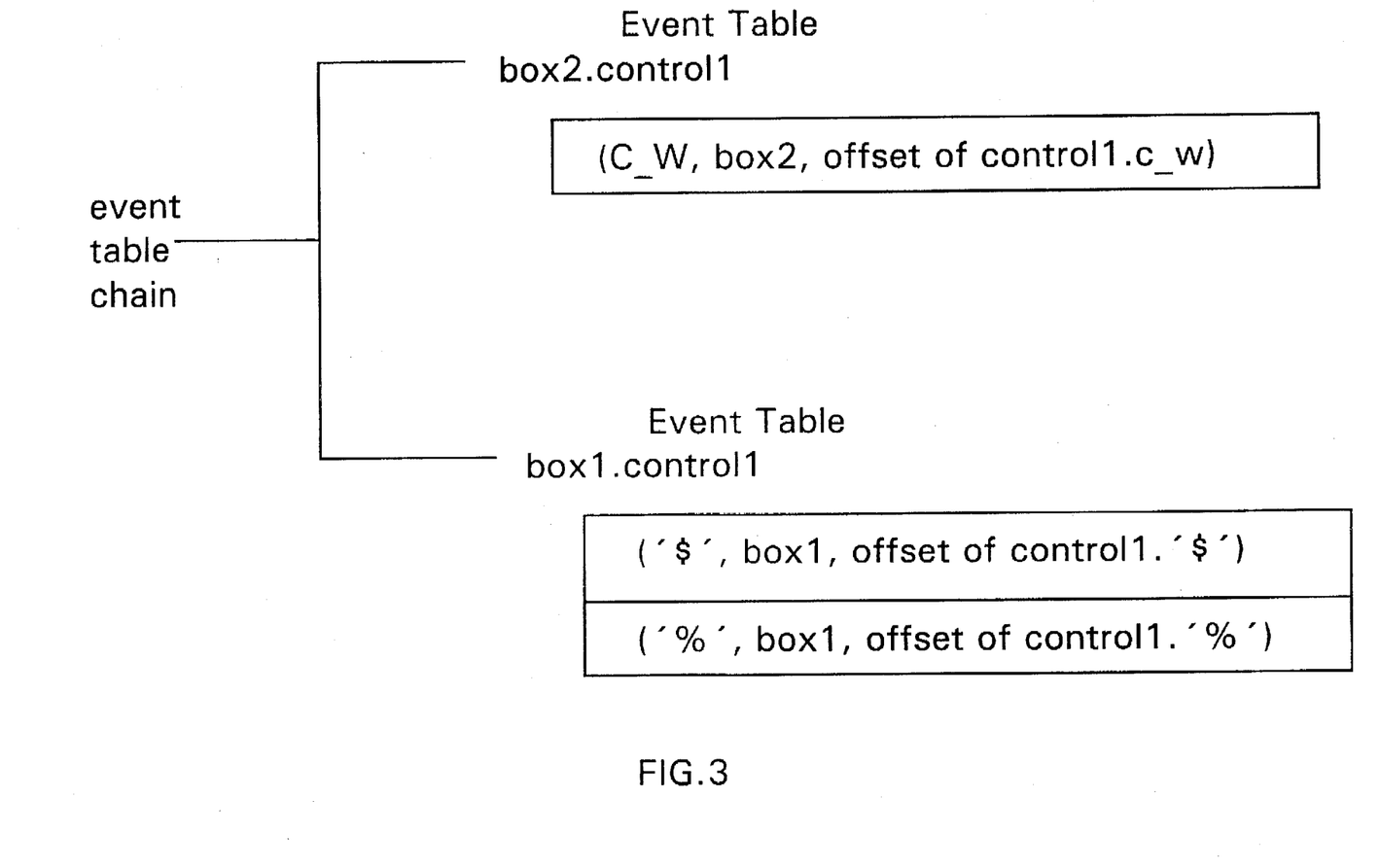
FIG. 3 is a schematic depiction of event tables linked in an event table chain according to the first embodiment.

FIG. 3 is a graphical representation of the chain of code pointers. The parenthesis pairs represent the name of the event followed by the module (file) name, followed by the offset to the event handling code.

The resulting source code may be compiled to object code and then run in a suitable computer. In running the object code, the linked lists of event tables are scanned, so that the object code for the original commands is sought out and executed.

C++ Language Implementation

In a C++ language implementation, the key elements are the same. A class is used to group the code instead of an event table and each event handler is defined as a method in the class.

1. When a user creates a new, empty dialog box, the name given to the dialog box is different from all existing dialog boxes the user has already created. A class name is maintained with the dialog box which is based on the dialog box name. In my implementation I name the class the same as the dialog box but prefix it with an underscore ("_").

2. When the user creates a new child control (object) on the dialog box, maintain a control name which is different from other controls on the dialog box. Also maintain a class name with the control which is based on the control name and the dialog box name. If the dialog box has the name "box1", possible class names for two child control objects could be"box1control1" and "box1control2".

Figure 4:
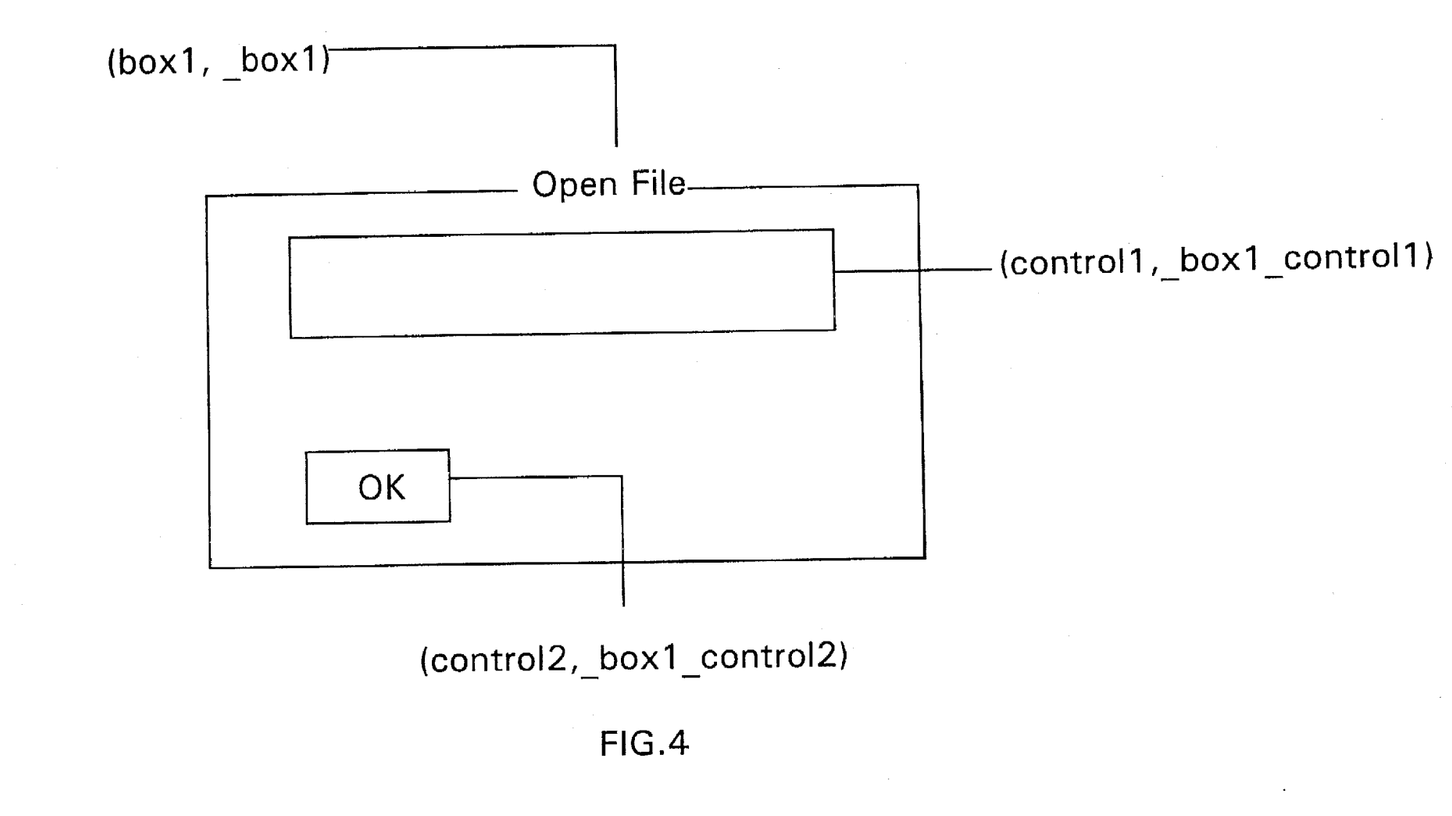
FIG. 4 is a schematic depiction of an original video display screen showing objects, with references to their associated names according to a second embodiment of the invention.

Referring to FIG. 4, a copying method for C++ similar to that described above will be shown. The parenthesis pairs represent the name of the object to the left of the comma and the class name on the right. Assume that control1represents an input field in which the user types and control2represents a button (OK button) which is pushed when the user has finished typing into the input field. The above dialog box might be used as a simple way for a user to enter a file name. As an example, assume the program is being written not to allow percent ('%') or dollar sign ('$') characters to be typed into the input field. In C++, the code for processing the dialog box for box1is as follows:

```
// Define the classes that require methods
    class_box1_control1:control {    // Must inherit control class
```

```
    public:                          // which defines default methods
       void percent( );              // and properties.
       void dollar( ):
};
class_box1_control2:control {    // Must inherit control class
    public:                          // which defines default methods
       void ibutton_up( );
};
// Methods for control1
void_box1_control1::percent( )
{
_beep( );
}
void_box1_control1::dollar( )
{
_beep( );
}
// Method for control2
void_box1_control2::Ibutton_up( )
{
// Close the dialog box window and return the result
p_active_form->_delete_window(find_control("control1")->p_text);
}
```

The invention enables the making of a copy of box1 while maintaining code pointers to the original code. The new object will look like FIG. 5.

Figure 5:
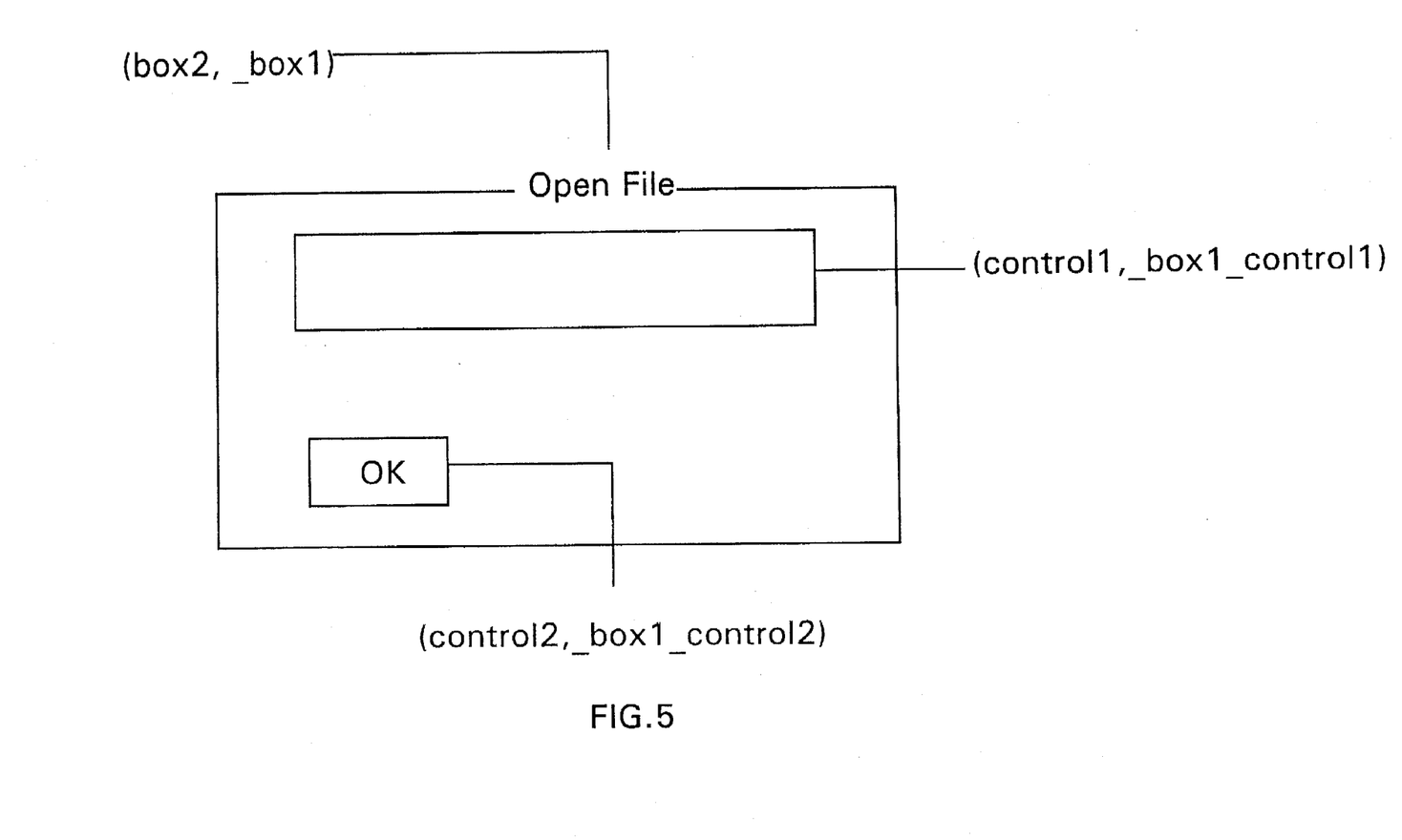
FIG. 5 is a schematic depiction of a video display screen showing copied objects, with references to their associated names according to the second embodiment.

The new dialog box must be given a name which is different than "box1". FIG. 5 illustrates that the new dialog box has been given the name "box2". All child controls keep the same name as before. ALL class names for the dialog box "box2" remain the same. This allows the new dialog box to execute (inherit) the same code as the original dialog box.

In this embodiment code may be added to the new dialog box without affecting the code for the original dialog box. Assume for example that the reason for copying the open file dialog box is to create a similar dialog box which is used to find a user-specified string in a file he or she is editing. In addition, for some reason the programmer does not want this input field to allow a percent ('%') or a dollar sign ('$') either. However, let's say when the user presses Ctrl-W in the input field, the program being written is to insert the word at the cursor in the file being edited into the input field to permit searching for other occurrences.

The programmer uses the dialog editor to change the caption of dialog box "box2" from "Open File" to "Find". Then the programmer selects the input field control and tells the dialog editor of his desire to write an event handler for the selected object. In the example, the programmer selects 'Ctrl-W' as the event to modify. The dialog editor detects the need for inheritance by noticing that the existing class attached to the input field control1does not belong to this control because the name of the class is "box1control1". Notice that "box1", the name to the left of the second underscore, is not the name of the dialog box ("box2") with an underscore inserted at the front. Therefore, the dialog editor inserts the following code into a new source file for dialog box "box2":

```
// box2 source
    class_box2_control1:_box1_control1{// Inherit_box1_control1 class
    public:
       void c_w( );
    };
void_box2_control1::c_w( )
{
}
```

Now the programmer can fill in the code for the method as follows:

```
class_box2_control1:_box1_control1 {
public:
    void c_w( );
};
void_box2_control1::c_w( )
{
keyin(get_cur_word( ));
}
```

Notice that the class statement above inherits the original class. This creates a linked list of classes (inheritance chain) that can be scanned for methods for the control. If the programmer were to make a copy of dialog box "box2" and add another event handler to the input field control, the dialog editor would link a class called "box3control1" and link it to "box2control1". For C++, the compiler performs this scanning and writes a copy of the found code in the object code for the daughter box, so that no scanning is required when the program is executed.

Figure 6:
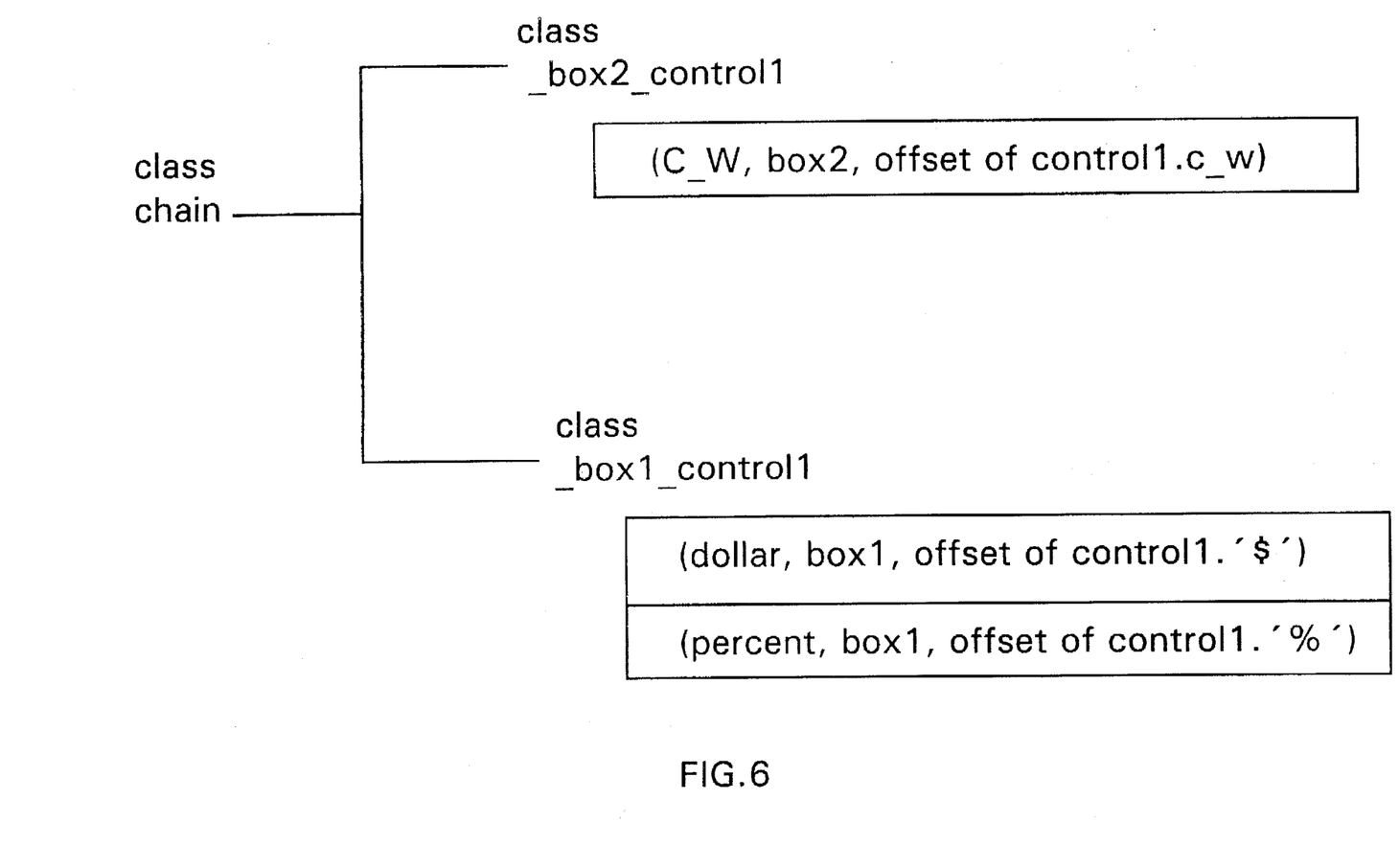
FIG. 6 is a schematic depiction of C++ classes linked in a class chain according to the second embodiment.

FIG. 6 depicts the class tree of code pointers. The parenthesis pairs represent the name of the method followed by the module (file) name, followed by the offset to the method handling code.

The examples above show how to copy an entire dialog box and preserve the code pointers. Sub-trees of controls may be copied as well. To copy control1 and control2, onto an existing dialog box, select both controls using the dialog editor. Copy the controls to the new dialog box and preserve the event table names in the new controls.

When copying controls from one dialog box to an existing dialog box which already has control(s) with the same name, the invention renames the new controls and leaves the existing control names unchanged. The programmer may then delete existing controls before copying the same controls twice. Alternatively, the program according to the invention may prompt the user to replace a control whose name conflicts. Changing the names of controls does not affect the code pointers. However, there are cases when groups of controls communicate with each other by referencing the control name. Control names are referenced relative to the active dialog box. Typically, the programmer will choose better names than "control1" and "control2" so that the names of controls do not conflict often when they are copied to another dialog box.

In addition to implementation in SlickC, SlickEdit and C++ languages, the invention may be implemented in any object-oriented language, including object-oriented Pascal.

Those of ordinary skill in the art will appreciate that various modifications can be made to the apparatus as specifically described and still fall within the scope of the invention.

What is claimed is:

1. A software developer's tool to help write application programs for an object-oriented operating system comprising a computer including a storage device holding code, said code including
  a copying utility,
  a first code section permitting the identification of a parent object and associated code including event tables, a parent object identifier and event table identifiers, the event tables signifying events capable of taking place during running of an application program to be written,
  a second code section permitting the creation of a child object identical to the parent object, by actuation of said copying utility which creates the child object by referencing the associated code and event tables of the parent object which code pointers allowing the child object to run independently of and without affecting the parent object,
  said second code section generating a unique child object identifier for the child object different from but derived from the parent object identifier and generating a unique child object event table identifier for each event table of the child object derived from the parent object identifier and associated with said child object, the object and event table identifiers providing information regarding the relationship between objects, and objects and event tables, and
  an editing utility permitting editing of the child object event tables in a manner linking new events for the child object event tables to the parent object event tables,
  wherein repeated sequential use of said code sections creates a chain of parent and child objects having a linked list of event tables with unedited code of the child objects referencing code of the parent.

2. A tool as claimed in claim 1 wherein the event tables include controls and the editing of a child event table may include creating a new control on said child event table with an identifier different than any other controls on said child event table.

3. A tool as claimed in claim 1 wherein said parent and child objects are dialog boxes.

4. A tool as claimed in claim 1 wherein said code is in C++ language and said event tables is a C++ class and the events within said event tables are C ++ methods.

5. A tool as claimed in claim 1 wherein an event table includes controls having identifiers derived from said identifier of said event table.

6. A tool as claimed in claim 5 wherein each of said controls and event tables are objects.

7. A tool as claimed in claim 1 wherein running said code sections writes source code for said child object such that said source code for said child object includes pointers to source code for said parent object, thereby allowing source code for said child object to run said source code for said parent.

8. A tool as claimed in claim 7 wherein running said code sections permits editing of a child object event table to cause the running of said source code for said child object to be different from the running of said source code for said parent object, without modifying said source code for said parent object.

9. A tool as claimed in claim 1 wherein the running of said second code section creates an index of said linked list of the event tables to facilitate finding and executing event handlers when the application program of said child object is run.

10. A tool as claimed in claim 1 wherein said copying utility is a clipboard copying utility.

11. A tool as claimed in claim 1 wherein running the code sections writes source code of the application program such that upon compiling the application program source code to object code, said object code for said child object includes pointers to said object code for said parent object to run said object code of said parent object when running said object code of said child object.

12. A tool as claimed in claim 11 wherein running said code sections permits editing of said child object event tables in a manner allowing the running of said object code for said child object to be different from the running of said object code for said parent object, without modifying said object code for said parent object.

13. A tool as claimed in claim 11 wherein in the compilation of the application program, said object code for said child object includes object code copied from said parent object.

14. A tool as claimed in claim 1 wherein said tool is included in object-oriented Pascal language.

15. A software developer's tool to help write application programs for an object-oriented operating system comprising a computer including a storage device holding code, said code including a clipboard copying utility, a first code section permitting the identification of dialog boxes having event tables associated with the dialog boxes, said event tables signifying events capable of taking place during running of application program to be written, a second code section permitting the creation, by actuation of said clipboard copying utility, of a child dialog box having event tables associated with the child dialog box identical to the parent dialog box and derived from the parent dialog box event tables in a manner allowing the child dialog box event tables to reference the parent dialog box event tables while running independently of the parent dialog box, providing a unique object name for said child dialog box, and generating an event table name for each child dialog box event table associated with the child dialog box and derived from the name of said parent dialog box such that a child dialog box event table includes controls having names derived form the name of the parent dialog box event table, and a third code section permitting editing of a child dialog box event table without altering the parent dialog box event table and, after repeated sequential use of said code sections, creating a chain of said parent and child dialog boxes having a linked list of event tables, the dialog box and event table names providing information regarding the relationship between dialog boxes, and dialog boxes and event tables, and whereby the sequential use of said first, second and third code sections creates a parent dialog box and a child dialog box having associated parent and child event tables, said child dialog box having an event table derived from said parent event table and having the capability of running independently of said parent dialog box and wherein the repeated use of the second code section results in a chain of parent and child dialog boxes and a linked list of event tables.

\* \* \* \* \*

UNITED STATES PATENT AND TRADEMARK OFFICE
CERTIFICATE OF CORRECTION

PATENT NO. : 5,710,926
DATED : January 20, 1998
INVENTOR(S) : Joseph Clark Mauer It is certified that error appears in the above-indentified patent and that said Letters Patent is hereby corrected as shown below:

Column 9, line 53,
In Claim 1, Line 1, insert the word --computer-- between the words write and application.

Signed and Sealed this

Seventeenth Day of March, 1998

Attest:

BRUCE LEHMAN

*Attesting Officer*     *Commissioner of Patents and Trademarks*